United States Patent
Joong et al.

(10) Patent No.: US 8,806,524 B1
(45) Date of Patent: Aug. 12, 2014

(54) RESTRICTING USE OF A DIRECT-TO-HOME DIGITAL BROADCAST SATELLITE SIGNAL

(71) Applicant: Telefonaktiebolaget L M Ericsson (Publ), Stockholm (SE)

(72) Inventors: Donald Joong, Montreal (CA); Ganish Katyal, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/752,905

(22) Filed: Jan. 29, 2013

(51) Int. Cl.
 *H04N 5/445* (2011.01)
 *H04N 7/167* (2011.01)
 *G06F 21/24* (2006.01)

(52) U.S. Cl.
 USPC .................................. 725/25; 725/30; 725/80

(58) Field of Classification Search
 CPC .......... H04N 21/4753; H04N 21/4532; H04N 21/4751; H04N 21/441; H04N 21/4365; H04N 21/25816; H04N 21/2541; H04N 21/4524; H04N 7/1675; H04W 12/06; H04W 12/08; H04W 48/04; H04L 63/0861; H04L 63/10; H04L 63/0492; G06F 2221/0708
 USPC .............................. 725/30, 25, 80
 See application file for complete search history.

(56) References Cited

U.S. PATENT DOCUMENTS

| | | | |
|---|---|---|---|
| 5,036,537 A | 7/1991 | Jeffers et al. | |
| 6,009,116 A | 12/1999 | Bednarek et al. | |
| 6,108,365 A * | 8/2000 | Rubin et al. | 375/130 |
| 7,577,150 B2 * | 8/2009 | Poustchi et al. | 370/395.3 |
| 8,127,320 B2 * | 2/2012 | Matsuda et al. | 720/664 |
| 8,196,169 B1 | 6/2012 | Herz | |
| 8,280,595 B2 * | 10/2012 | Foster et al. | 701/50 |
| 2006/0248557 A1 * | 11/2006 | Stark et al. | 725/37 |
| 2010/0155592 A1 * | 6/2010 | Yang et al. | 250/282 |
| 2010/0174273 A1 * | 7/2010 | Murakami | 606/4 |
| 2011/0055852 A1 | 3/2011 | Smith et al. | |
| 2013/0010962 A1 * | 1/2013 | Buer et al. | 380/270 |
| 2013/0078955 A1 * | 3/2013 | Huckins | 455/411 |

\* cited by examiner

*Primary Examiner* — Pankaj Kumar
*Assistant Examiner* — Reuben M Brown
(74) *Attorney, Agent, or Firm* — Christopher & Weisberg, P.A.

(57) ABSTRACT

A method and device for authentication of subscription based digital media receivers, SB DMRs are disclosed. According to one aspect, an SB DMR includes a memory, a radio, and a processor. The memory is configured to store an identification of each of at least one other SB DMR sharing a common subscription to a digital media service. The radio is configured to receive the identification of each of the at least one other SB DMR. The processor is configured to authenticate the SB DMR based on the received identifications to determine if the SB DMR is part of a group of SB DMRs sharing a common subscription.

18 Claims, 6 Drawing Sheets

RESTRICTING USE OF A DIRECT-TO-HOME DIGITAL BROADCAST SATELLITE SIGNAL

TECHNICAL FIELD

The present invention relates to restricting use of a digital media service to a group of subscription based digital media receivers.

BACKGROUND

Direct to home-satellite, also known as digital broadcast satellite, DBS, service providers typically sell subscriptions for their services to households. To remain competitive with cable solution providers, and other technology solution providers, multiple subscription based digital media receivers, SB DMRs, to support multiple screens may be offered within one subscription. Thus, for example, a homeowner may have several SB DMRs in various rooms within the home, with each of the STBs supported by the subscription.

Providing multiple SB DMRs within a DBS satellite subscription gives users the opportunity to sell or rent out extra STBs, without authorization, as long as the extra SB DMRs have a line of sight to the broadcasting satellite. Thus, DBS satellite broadcast signals are often stolen by users with legitimate subscriptions who share out there provisioned SB DMRs to others who live in a -separate household. In other words, once a STB is activated pursuant to a subscription, the subscriber may improperly allow its removal to a new but unauthorized location to be used by an unauthorized person. This ostensibly results in the DBS satellite subscription being stolen as service providers generally provide subscriptions on a building by building, or business by business basis.

Currently, using positioning information from the Global Positioning System, GPS, the satellite service provider may determine the location of each provisioned SB DMR and enforce a usage policy based on knowledge of SB DMR geographic position. Using GPS is relatively expensive, as each SB DMR must have a GPS receiver and a transmitter to transmit position information to the satellite service provider. Further, in some dwellings, a GPS satellite signal cannot be received so that position of a SB DMR within the dwelling cannot be determined.

SUMMARY

The present invention advantageously provides a method and device for authentication of subscription based digital media receivers, SB DMRs. According to one aspect, an SB DMR includes a memory, a communication interface, and a processor. The memory is configured to store an identification of each of at least one other SB DMR sharing a common subscription to a digital media service. The communication interface is configured to receive the identification of each of the at least one other SB DMR. The processor is configured to authenticate the SB DMR based on the received identifications to determine if the SB DMR is part of a group of SB DMRs sharing a common subscription.

According to this aspect, in some embodiments, the communication interface is a radio and a range of transmission of the radio is attenuated by an amount to prevent transmission of the identification of the SB DMR to other SB DMRs not sharing the common subscription. In some embodiments, the processor is further configured to deny viewer access to the content associated with the subscription when it cannot be determined that the SB DMR is part of the group of SB DMRs sharing the common subscription.

In some embodiments, the communications interface is a radio that is further configured to operate at a frequency associated with the common subscription. In some embodiments, the processor is further configured to permit viewer access to the content associated with the subscription when it is determined that the SB DMR is part of the group of SB DMRs sharing the common subscription. In these embodiments, the frequency may be sent to each SB DMR sharing the common subscription. In some embodiments, the identification of each of the at least one other SB DMR are media access control, MAC, addresses. In some embodiments, the at least one other SB DMR sharing the common subscription are designated by the digital media service. In these embodiments, when one of the at least one other SB DMR ceases to function, the designation is updated to include only the remaining functional SB DMRs sharing the common subscription.

According to another aspect, the invention provides a method of restricting use of a digital media service to a group of subscription-based digital media receivers, SB DMRs, of a subscriber. The method includes transmitting from a first SB DMR in the group an identification of the first SB DMR to at least one of the other SB DMRs in the group. The transmission power is limited in range so as to reach only the other SB DMRs in the group and to exclude SB DMRs not in the group. The method further includes receiving from at least one of the other SB DMRs in the group an identification of the at least one other SB DMR. The first SB DMRs attempts to authenticate itself based on the identification of the at least one other SB DMR in the group.

According to this aspect, in some embodiments, if not all of the other SB DMRs can be identified, a viewer is denied access to the content associated with the subscription in the first SB DMR. In some embodiments, the range is specified as a term of the subscription. In some embodiments the identification of the first SB DMR is transmitted periodically. The frequency of transmission may be determined by the digital media service. In some embodiments, the method further includes comparing the received identifications to identifications stored in a database of the first SB DMR to authenticate the first SB DMR as a part of the group of SB DMRs.

According to yet another aspect, the invention provides a method of restricting availability of a digital media service to a group of subscription-based digital media receivers, SB DMRs, where each SB DMR has a unique identifier. The method includes determining a power of transmission from a first one of the SB DMRs. The determined power enables a transmission of an identifier to reach each of the other SB DMRs in the group, while precluding the transmission from reaching SB DMRs not in the group. The method further includes transmitting the identifier from the first one of the SB DMRs to the other SB DMRs in the group. The method also includes receiving from at least one of the other SB DMRs in the group an identification of the at least one other SB DMR. The method also includes attempting to authenticate the first one of the SB DMRs based on the received identifications. The authentication of the first one of the SB DMRs is successful if the identification of at least one other SB DMR in the group has been received.

According to this aspect, in some embodiments, the method further includes enabling play of content of a digital broadcast signal by the first one of the SB DMRs only if authentication is successful. In some embodiments, the power is determined prior to receiving the digital broadcast signal. Alternatively, the power may be controlled by the digital broadcast signal. In some embodiments, the method includes denying play of content of a digital broadcast signal by the first one of the SB DMRs if authentication is unsuccessful.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside primarily in combinations of apparatus components and processing steps related to restricting use of a digital media service to a group of subscription based digital media receivers. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein include set top boxes, STB, and Internet Protocol Television, IPTV, terminal functions, ITF, that are subscribed to a DBS satellite service, and as such, the STBs and ITFs are referred to herein as subscription based digital media receivers, SB DMRs. An SB DMR will have information regarding the identity of other peer SB DMRs included in the subscription. For example, a home may have several SB DMRs in different rooms within the home, where each authenticated SB DMR enables viewing of content received from the satellite signal. In some embodiments, during an activation phase, each SB DMR is provided with an identification number of the other SB DMRs within the subscription for the home. This identification information may be updated at a later time through the satellite broadcast channel.

In one embodiment, each SB DMR is equipped with a radio frequency, RF, transceiver to transmit its identification to the other SB DMRs and to receive the identifications of the other SB DMRs. The range of these transceivers is limited to reach only SB DMRs in proximity to each other, and to exclude SB DMRs outside the range. In some embodiments, the transceivers may be WiFi transceivers operating within a home WiFi network. In some embodiments, the transceivers are set to operate at a carrier frequency that is specific to the group of SB DMRs within the subscription. Since the functions of the RF transceiver, as described herein, may be relatively simple, a low cost RF transceiver may be employed.

When an SB DMR receives identifications from the other SB DMRs within the group, it compares the received identifications to a set of identifications stored in its database. If all SB DMR identifications in the group have been received, the SB DMR is enabled so that the user of the SB DMR may view content provided by the satellite signal. In other words, the SB DMR is authenticated to allow its decoding of satellite signals for the subscribed channels when all other SB DMRs are in proximity, i.e., within the home. If not all SB DMR identifications in the group are received, the SB DMR may be disabled to deny content to the user of the SB DMR. In this way, the subscription is limited to only the intended SB DMRs within the home, since an unauthorized SB DMR outside the home will be outside the transmit range of the SB DMRs within the home. Note that in some embodiments, receipt of a specified one or more, but less than all, of the identifications of the other SB DMRs may be sufficient to enable an SB DMR. In other embodiments, there may be a master SB DMR and subordinate SB DMRs. A subordinate SB DMR is authenticated, if and only if, it is within proximity to the master SB DMR and therefore able to receive its identification.

Figure 1:
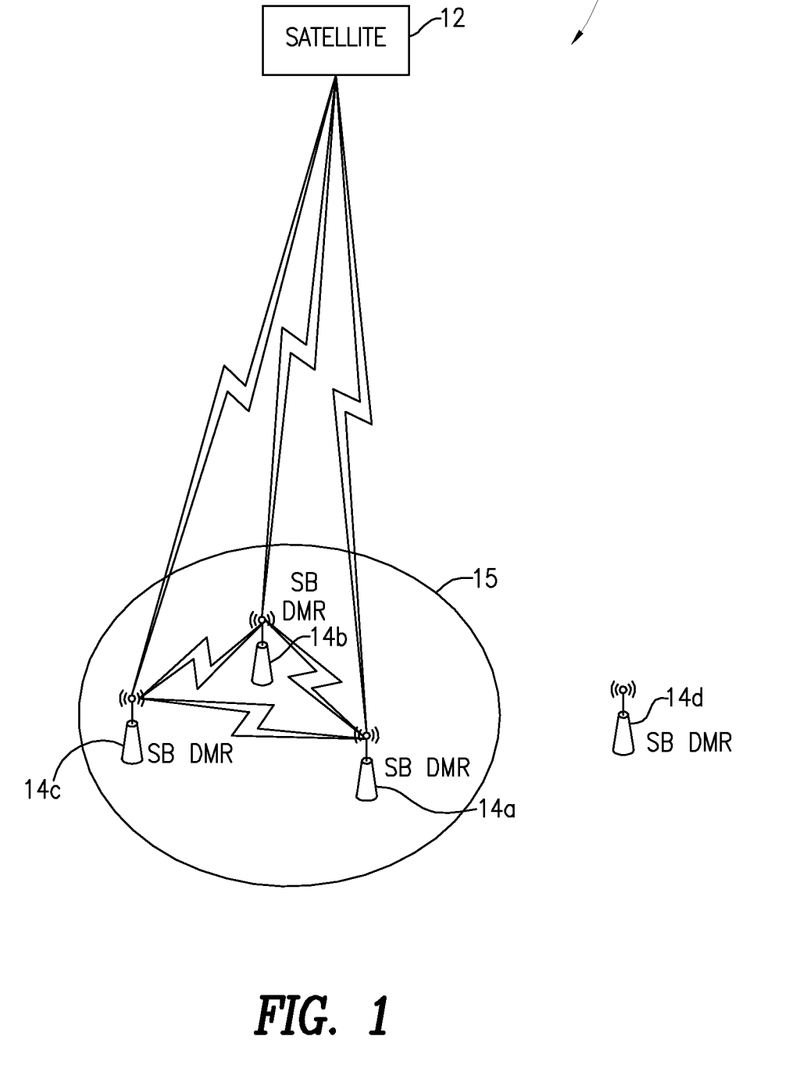
FIG. 1 is a diagram of a satellite communication system constructed in accordance with principles of the present invention.

Referring now to the drawing figures, there is shown in FIG. 1 a diagram of a satellite communication system 10 having a satellite 12 in communication with SB DMRs 14a, 14b and 14c, constructed in accordance with principles of the present invention. In FIG. 1, SB DMRs 14a, 14b and 14c, referred to collectively herein as SB DMRs 14, are within range of each other, whereas the SB DMR 14d is out of range of the SB DMRs 14a, 14b and 14c. For example, the SB DMRs 14a, 14b and 14c may be within a first house located in separate rooms and the SB DMR 14d may be located in a second house. The shaded subscription area 15 in FIG. 1 thus represents the area in which SM DMSs can be authenticated to share a subscription. Thus, SB DMRs 14a, 14b and 14c that are within the same subscription group, and SB DMR 14d is not within the subscription area 15.

When a new subscription is activated, the power of each SB DMR is set so that its transmission range is limited to reach only those SB DMRs within the subscription. Thus, a SB DMR may have a transmitter that has a variable power output that can be controlled by a signal from the satellite or may be set at the time of installation of the SB DMR. Further, the database of each SB DMR is loaded with the identifications of the other SB DMRs within the group of SB DMRs within the subscription zone. The identification of an SB DMR may be its media access control, MAC, address, a TCP/IP address, or any other unique address. Each SB DMR may periodically transmit its identification, which is received by the other SB DMRs within its range. The transmission of an identification of one SB DMR to another SB DMR may be initiated in response to a control signal carried by the satellite signal. Thus, for example, the satellite may broadcast a control signal. In response to the control signal or expiration of a timer, an SB DMR may transmit its identification, and wait for a predetermined time to receive identifications from the other SB DMRs within the subscription group. Therefore, if an activated and authenticated SB DMR is subsequently moved out of range of the other SB DMRs it will no longer be able to self-authenticate, when the next periodic authentication round occurs. Upon failing to self-authenticate, the SB DMR will cease decoding the satellite signal content, and thereby disable the playing of content to the user.

In an alternative embodiment, each SB DMR may perform a self-authentication process by determining if at least one SB DMR identification in its database that is associated with a group is matched to an SB DMR identification received from an SB DMR in the group. If the identification of at least one SB DMRs in the group is received, the SB DMR self-authentication process is successful, and the SB DMR is activated to provide content to a user. If the at least one identification of the SB DMRs of the group is not received, then the self-authentication process is unsuccessful, and the SB DMR is at least partially disabled so that content carried by the satellite signal is denied to the user. In some embodiments, the SB DMRs 14a, 14b and 14c are connected by wires, rather than by radio, in which case, the authentication process involves receiving identifications over the wires. Devices to be excluded are not connected to the devices to be included.

Figure 2:
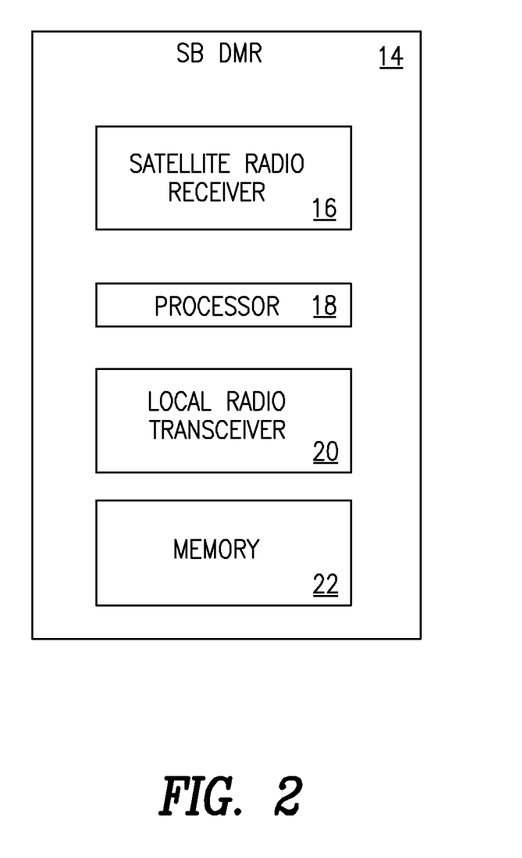
FIG. 2 is a block diagram of an exemplary SB DMR constructed in accordance with principles of the present invention.

FIG. 2 is a block diagram of an exemplary SB DMR 14 constructed in accordance with principles of the present invention. The SB DMR 14 includes a satellite radio receiver 16, a processor 18, a local radio transceiver 20 and a memory 22. The satellite radio receiver 16 receives a satellite signal from a satellite 12. The satellite signal contains encoded content that is intended for SB DMRs having a subscription to the satellite service. The satellite signal is broadcast, but only SB DMRs that have a subscription are able to decode the satellite signal. Thus, for example, a user in a first household may have three SB DMR for which a subscription is paid, and each of the three SB DMRs are enabled to decode the satellite signal if authenticated according to the methods described herein.

The satellite signal may also contain the identifications of the SB DMRs within a subscription. These identifications can be received by an SB DMR and stored within its database. The satellite signal may further include a frequency at which the local radio transceiver operates. The satellite signal may further include a transmission control signal that controls the transmission range of the local radio transceiver 20. Thus, in addition to setting the identifications of the SB DMRs, the frequency at which they transmit, and the transmission range of each SB DMR, at the time of activation of the subscription, this information may be updated periodically via the satellite signal. Or alternatively, each SB DMR may be connected to the Internet, and this information can be transmitted to each SB DMR from the service provider via the Internet.

The local radio transceiver 20, which may be a WiFi receiver, receives identifications from other SB DMRs and transmits its own identification to other SB DMRs. The memory 22 may be arranged as a database that stores identifications of SB DMRs within a subscription. The memory may also store software for execution by the processor 18. Such software may include satellite signal decoding algorithms and software for implementing a graphical user interface, for example. The processor 18, operating under the direction of software, compares an identification received from an SB DMR to an SB DMR identification from its database memory 22. If all—or in some embodiments, less than all but at least one—of the identifications of a group are matched to a received identification, then the SB DMR is self-authenticated, and content from the satellite is enabled to be played at each authenticated SB DMR.

The processor 18 may also set the frequency and/or the range of the local radio transceiver 20 in response to these parameters being specified by the satellite signal. Also, in the event that an SB DMR ceases to function properly, a fault signal may be transmitted to the other SB DMRs in the subscription group. Each SB DMR receiving the fault signal may then remove the identification of the faulty SB DMR from its database, so that it no longer needs to be matched for self-authentication to be achieved. In an alternative embodiment, the satellite signal updates the databases of the remaining operative SB DMRs with a set of identifications that excludes the identification of the faulty SB DMR, so that the excluded identification is not needed for authentication. The signal updates may also be received via the Internet. Thus, for example, the DBS service provider may transmit a signal, via satellite or the Internet, to the user prompting the user to enter one or more codes for each SB DMR that is operational. These codes may, for example, be entered using a remote control. Upon receipt of the code(s) the DBS service provider may download the identifications of the SB DMRs within the subscription for which the codes are received. The codes may also be provided telephonically by a representative of the service provider.

Figure 3:
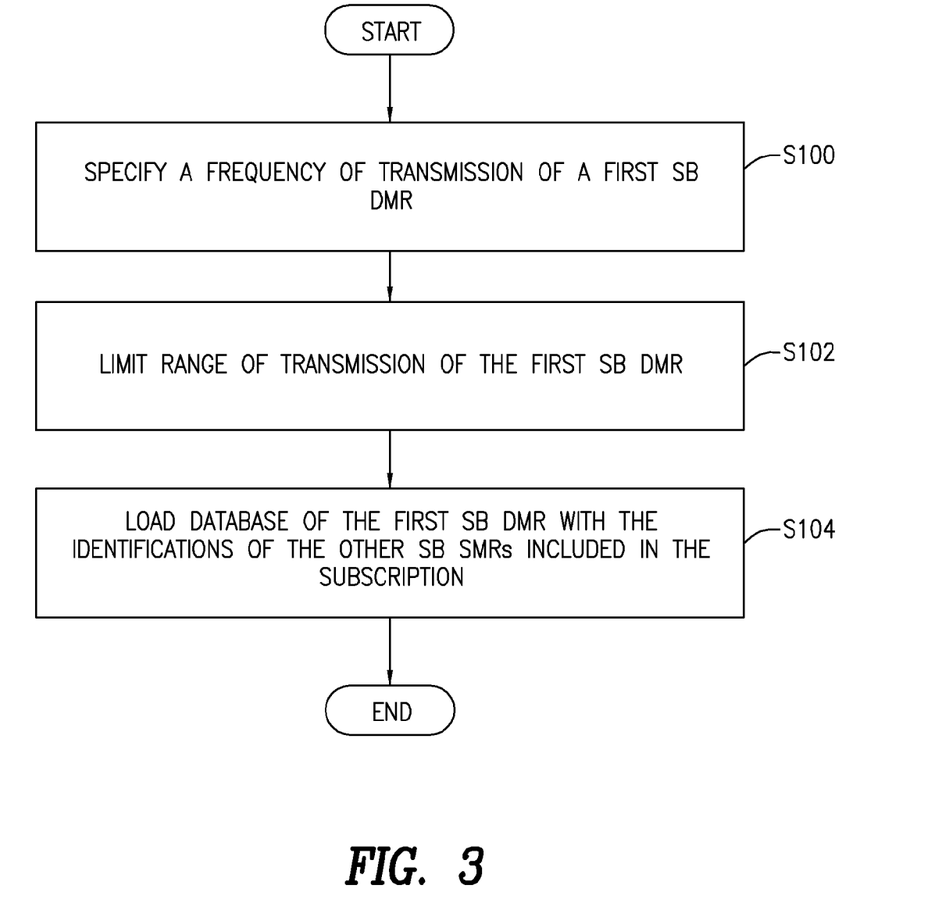
FIG. 3 is a flowchart of an exemplary process for activating a subscription that authorizes a group of SB DMRs to authenticate themselves.

FIG. 3 is a flowchart of an exemplary process for activating a subscription that authorizes a group of SB DMRs to receive and play content from a satellite signal received from a satellite of a digital media service. A frequency of transmission of a first SB DMR is specified (block S100). Thus, in some embodiments, SB DMRs that do not operate at the specified frequency may be excluded, i.e., the SB DMRs cannot self-authenticate because they are not "listening" at the right frequency to receive the identifications. The transmission range of the first SB DMR is limited to a predetermined value (block S102). Therefore, an SB DMR that is not within range may be excluded. The transmit range of an SB DMR may be set by a technician upon initial installation and may be based, for example, on the size of the home.

A database of the first SB DMR is loaded with the identifications of the other SB DMRs included in the subscription (block S104). The identifications loaded in the database may be compared to identifications received from other SB DMRs to determine whether the first SB DMR is authorized to decode the received satellite signal. Note that this process may be performed for every SB DMR within a subscription group so that all SB DMRs are activated and are able to self-authenticate. This process may be performed periodically, every day for example, to invalidate the authorization of an SB DMR that is relocated out of range of the other SB DMRs.

Figure 4:
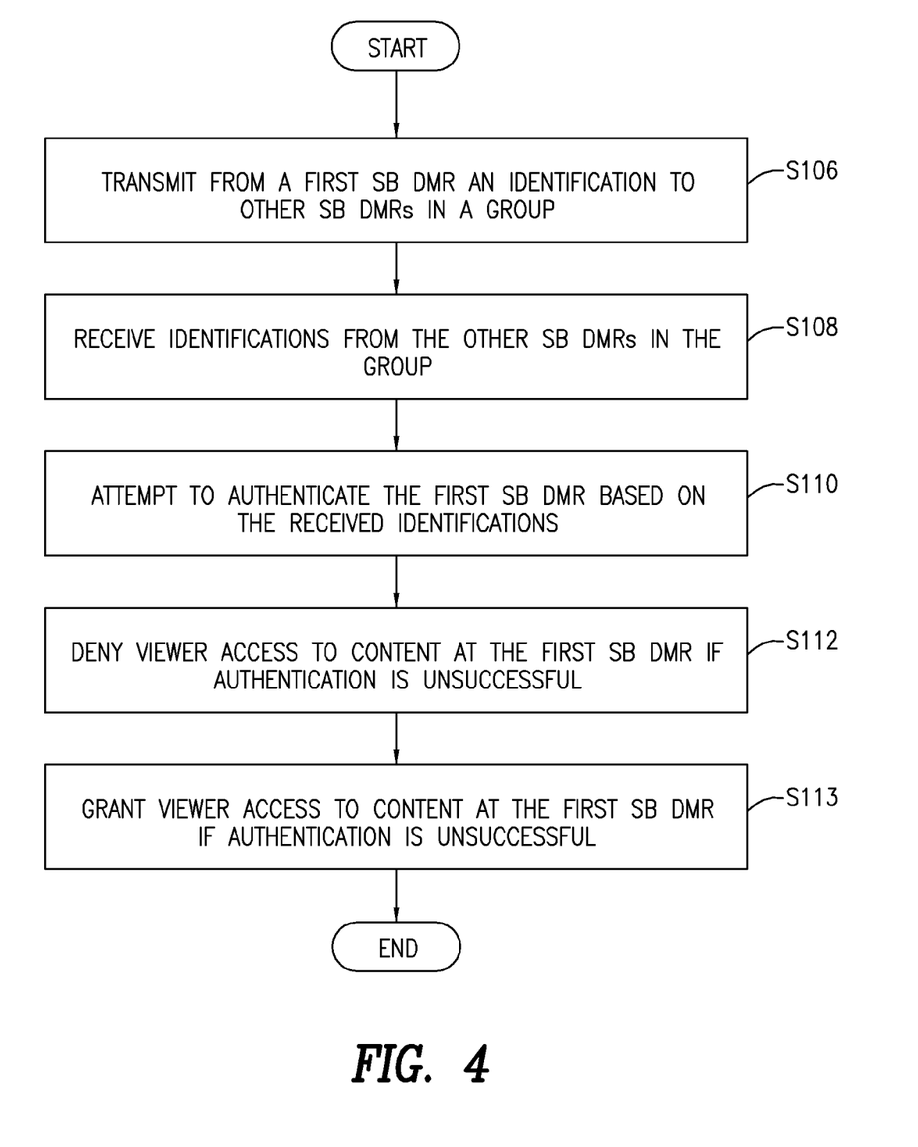
FIG. 4 is a flowchart of an exemplary process of transmitting information between SB DMRs to enable self-authentication of an SB DMR.

FIG. 4 is a flowchart of an exemplary process of transmitting information between SB DMRs to enable self-authentication of an SB DMR. A first SB DMR transmits an identification to other SB DMRs in a subscription group (block S106). The identification may be sent according to a suitable protocol that embeds the identification in a carrier signal or a packet that is carried by the carrier signal. The first SB DMR receives identifications of other SB DMRs in the group (block S108). Based on the received identifications, the first SB DMR attempts to authenticate itself (block S110). If authentication is unsuccessful, the viewer is denied content by the first SB DMR (block S112). If authentication is successful the viewer is granted access to the content (block S113).

Figure 5:
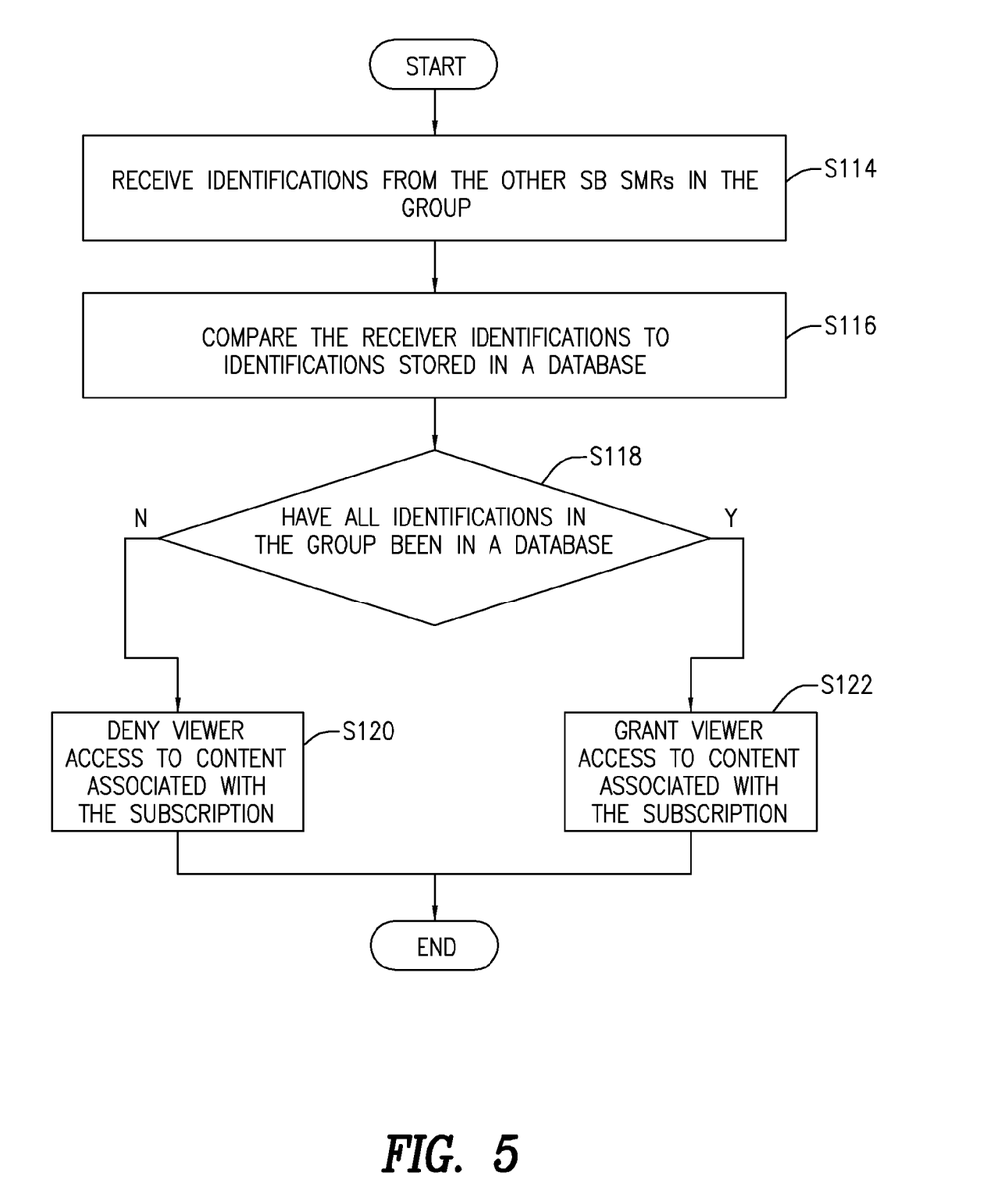
FIG. 5 is a flowchart of an exemplary process of authentication of an SB DMR.

FIG. 5 is a flowchart of an exemplary process for authentication of an SB DMR. Identifications are received by a first SB DMR from the other SB DMRs in a group (block S114). The received identifications are compared to identifications stored in a database of the first SB DMR (block S116). The first SB DMR determines whether all identifications of the SB DMRs of the group have been received (block S118). If not all of the identifications have been received, the viewer is denied access to content associated with the subscription (block S120). If, on the other hand, all identifications have been received, the viewer is granted access to the content associated with the subscription (block S122). In an alternative, a SB DMR may be self-authenticated if it does not receive all of the identifications of the other SB DMRs in the group, but receives one or more than one of those identifications.

Figure 6:
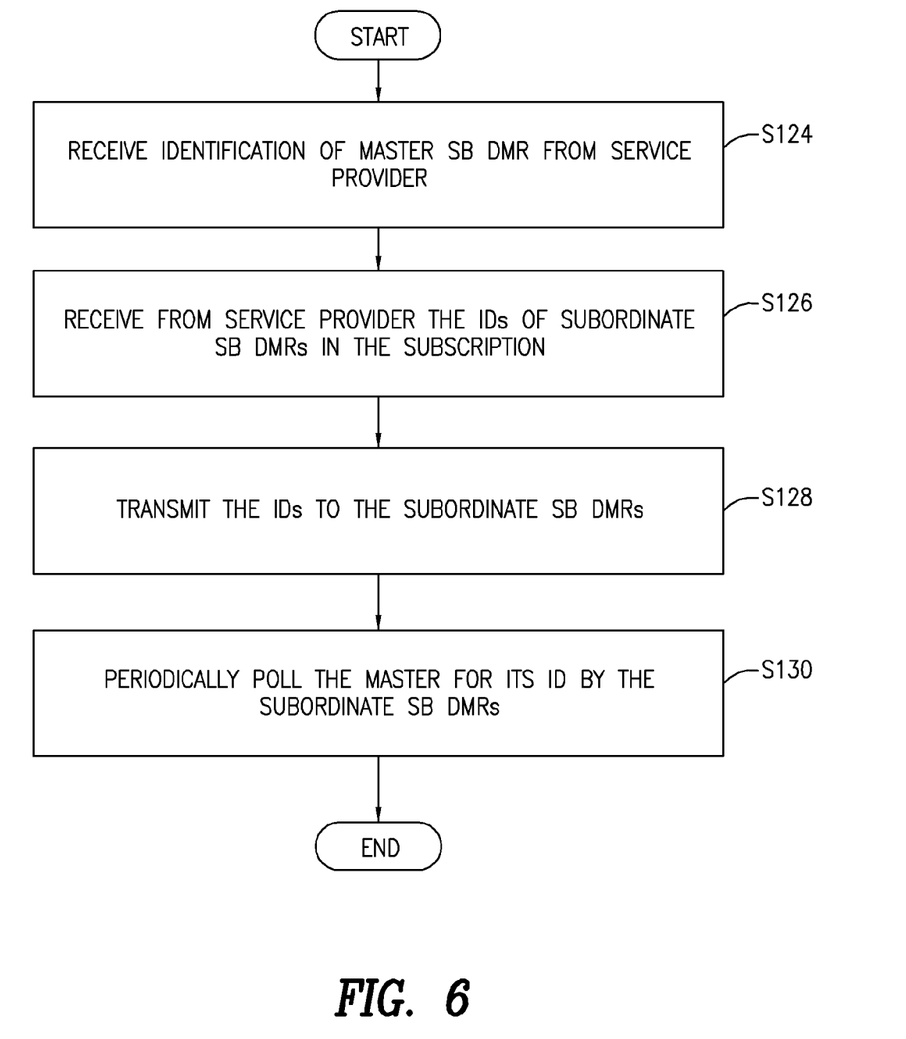
FIG. 6 is a flowchart of an exemplary process of another embodiment for authentication of SB DMRs.

FIG. 6 is a flowchart of an exemplary process of an embodiment for authentication of SB DMRs. In one embodiment, a master SB DMR 14 is in communication with a DBS service provider via satellite and the Internet. Via the satellite signal or the Internet, the master SB DMR receives an identification (block S124). The master SB DMR also may receive from the DBS service provider the identifications of subordinate SB DMRs included in the subscription (block S126). The subordinate SB DMR identifications may be transmitted to the respective SB DMRs (block S128). Periodically, the subordinate SB DMRs poll the master for its identification in order to self-authenticate (block S130). Thus, if a subordinate SB DMR is moved outside the range of the master SB DMR it will not be able to self-authenticate. In some embodiments, the master SB DMR may periodically poll the subordinate SB DMRs and if one or more is missing because it has moved out of range, the master SB DMR may report this to the DBS service provider via the Internet, for example.

Thus, embodiments enable the prevention of fraudulent use of DBS satellite signals and protect the satellite service provider from such fraudulent use. In embodiments described herein, an SB DMR that is not within range of the authorized SB DMRs cannot self-authenticate and the user of that SB DMR is denied access to the content that would otherwise be played by the SB DMR. In some embodiments, the identifications of SB DMRs included in a subscription may be specified and loaded into a database of each of the SB DMRs. This may be done initially at the time of activation of the subscription, and/or later via the satellite signal. Further, the range of each SB DMR is limited to reach only the SB DMRs within a predefined range, such as the SB DMRs within a household. An SB DMR outside this range is excluded and cannot self-authenticate to the subscription and is therefore denied access to the content of the satellite signal.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A subscription-based digital media receiver, SB DMR, comprising:
    a memory configured to store an identification of each of at least one other SB DMR sharing a common subscription to a digital media service, the identified at least one other SB DMR being pre-determined to be within a proximity to the SB DMR when the SB DMR is within a specified area;
    a communication interface configured to:
        receive an identification of one of the at least one other SB DMR; and
    a processor configured to:
        authenticate the SB DMR, the SB DMR being authenticated only if a received identification is of the at least one other SB DMR pre-determined to be within the proximity to the SB DMR when the SB DMR is within the specified area, the authentication indicating that the SB DMR is within the specified area and is therefore allowed to receive content.

2. The SB DMR of claim 1, wherein the communication interface is a radio, and a range of transmission of the radio is attenuated by an amount to prevent transmission of the identification of the SB DMR to other SB DMRs not sharing the common subscription.

3. The SB DMR of claim 1, wherein the processor is further configured to deny viewer access to the content associated with the subscription when it cannot be determined that the SB DMR is part of the group of SB DMRs sharing the common subscription.

4. The SB DMR of claim 1, wherein the communication interface is a radio that is further configured to operate at a frequency associated with the common subscription.

5. The SB DMR of claim 1, wherein the SB DMRs in the group are connected by wires.

6. The SB DMR of claim 1, wherein the processor is further configured to permit viewer access to the content associated with the subscription when it is determined that the SB DMR is part of the group of SB DMRs sharing the common subscription.

7. The SB DMR of claim 1, wherein the identification of each of the at least one other SB DMR are media access control, MAC, addresses.

8. The SB DMR of claim 1, wherein the at least one other SB DMR sharing the common subscription are designated by the digital media service.

9. The SB DMR of claim 8, wherein, when one of the at least one other SB DMR ceases to function, the designation is updated to include only the remaining functional SB DMRs sharing the common subscription.

10. A method of restricting use of a digital media service to a group of subscription-based digital media receivers, SB DMRs, of a subscriber, the method comprising:
    receiving, by a first SB DMR, from at least one of the other SB DMR in the group an identification of the at least one other SB DMR when the at least one other SB DMR is within proximity to the first SB DMR; and
    attempting to authenticate the first SB DMR when an identification of another SB DMR of the group is received by the first SB DMR, the first SB DMR being authenticated only if the received identification is of at least one other SB DMR pre-determined to be within proximity to the first SB DMR when the first SB DMR is within a specified area, the authentication indicating that the first SB DMR is within the specified area and is therefore allowed to receive content.

11. The method of claim 10, wherein, if not all of the other SB DMRs can be identified, denying viewer access to the content associated with the subscription in the first SB DMR.

12. The method of claim 10, wherein a maximum distance between SB DMRs is specified as a term of the subscription.

13. The method of claim 10, wherein the identification of the first SB DMR is transmitted periodically.

14. The method of claim 10, wherein a frequency of transmission is determined by the digital media service.

15. The method of claim 10, further comprising comparing the received identifications to identifications stored in a database of the first SB DMR to authenticate the first SB DMR as a part of the group of SB DMRs.

16. A method of restricting availability of a digital media service to a group of subscription-based digital media receivers, SB DMRs, each SB DMR having a unique identifier, the method comprising:
    receiving, by a first SB DMR, from at least one other SB DMR in the group an identification of the at least one other SB DMR when the at least one other SB DMR is within proximity to the first SB DMR;

attempting to authenticate the first SB DMR based on the received at least one identification, the authentication of the first one of the SB DMRs being successful only if the received at least one identification is of at least one other SB DMR predetermined to be within proximity to the first SB DMR when the first SB DMR is within a specified area, the authentication indicating that the first SB DMR is within the specified area and is therefore allowed to receive content.

17. The method of claim 16, further comprising, enabling play of content of a digital broadcast signal by the first one of the SB DMRs only if authentication is successful.

18. The method of claim 16, further comprising, denying play of content of a digital broadcast signal by the first one of the SB DMRs if authentication is unsuccessful.

* * * * *